|   | United States Patent [19] | [11] | 4,399,353 |
|---|---|---|---|
|   | Adkins et al. | [45] | Aug. 16, 1983 |

[54] COLOR COMPUTER WHEEL

[76] Inventors: James K. Adkins; Charlotte G. Adkins, both of 9806 Luke Ct., Upper Marlboro, Md. 20772

[21] Appl. No.: 285,913

[22] Filed: Jul. 23, 1981

[51] Int. Cl.³ .............................................. G06C 27/00
[52] U.S. Cl. .............................. 235/78 R; 235/88 R; 434/102; 434/104
[58] Field of Search ........................ 235/78 R–89 R; 434/98, 101, 102, 104, 170, 207; 116/335; 356/423

[56] References Cited

U.S. PATENT DOCUMENTS

| 1,762,036 | 6/1930 | Steedle | 434/104 |
| 2,237,165 | 4/1941 | Scheuer | 434/104 |
| 3,088,227 | 5/1963 | Tudor | 434/102 |

Primary Examiner—Benjamin R. Fuller
Attorney, Agent, or Firm—Francis B. Francois; Francis D. Thomas, Jr.

[57] ABSTRACT

A color computer wheel includes a white base member upon which four concentrically arranged discs are rotatably mounted by a central fastener, the discs decreasing in diameter from bottom to top and being made of a transparent sheet material. The top disc carries four concentric annular bands, each evenly divided into radial spaces. The three lower discs are each dedicated to a single primary color, and carry color bands arranged to register with the bands of the topmost disc, the color bands being divided evenly into radial spaces with progressive color shades thereon. The peripheries of the four discs carry legend strips, which identify the percentage of color in the radial spaces in alignment therewith.

6 Claims, 6 Drawing Figures

COLOR COMPUTER WHEEL

TECHNICAL FIELD OF THE INVENTION

This invention relates generally to devices for displaying different combinations of primary colors, for use by printers, artists and the like to assist in determining the composition of a given color or to select a desired color. More particularly, it relates to an improved color computer wheel constructed to simultaneously display a wide variety of colors composed from the three primary colors, and to indicate to the user the quantity of the three primary colors utilized to produce each of the colors displayed.

BACKGROUND OF THE INVENTION

Over the years there have been many devices invented for use by printers, artists and others in analyzing and comparing colors. Typically, there are two basic problems a user employs such devices to solve. The first is to determine the primary color makeup of a given color. The second is to select a desired color, and to know how the primary colors should be mixed to produce it. To these two basic purposes, users of color comparing and computing devices frequently add a number of related or similar uses.

With the availability of transparent material in sheet form, made from celluloid, plastic or the like, a new tool became available for constructing color comparison devices. Utilizing this material so that several sheets are employed, carrying differing shades of two or more primary colors, the sheets can be overlaid with different color shades imposed over the top of other shades to produce different colors. A number of color comparison or calculator devices employing such transparent sheet material have been invented, such as those shown in U.S. Pat. Nos. 2,240,053; 3,088,226; 3,088,227; 3,267,580; 3,314,167 and 4,241,520. All of the devices shown in these patents are useful. But at the same time, none of the devices offers the advantage of providing a simultaneous display of a large number of color combinations made by combining either pairs or all of three primary colors, combined with the ability to easily change the display and to instantly be aware of the precise combination of the primary colors that will produce a given displayed color. There is need for a color computer wheel with these capabilities, and the present invention satisfies that need.

BRIEF SUMMARY OF THE INVENTION

The color computer wheel of the invention includes a base member that is light in color, preferably white, and four concentrically arranged discs made of transparent material and rotatably mounted on the base member by a fastener passed through the common center point of the four discs. The discs are successively smaller in diameter moving from the bottom to the top of the stack, and the topmost or smallest disc is a comparator disc utilized to display the colors created by the other three discs.

The comparator disc has four annular bands thereon, each evenly divided into a plurality of radial spaces, with all the radial spaces on the four bands being in register or radial alignment with each other. One of the bands is intended to display a combination of two of the three primary colors, a second band a different pair of the primary colors, and the third band the third pair of primary colors. The fourth band displays a combination of all three primary colors, and is arranged to also allow blacktints to be blended with the three-color combinations.

Specifically, the fourth band on the comparator disc has one portion of its radial spaces clear and free of color, while the spaces of the other portion are tinted with progressively darker shades of black. By rotating the four discs, any of the combinations of three colors producible by the computer can be blended with any of the shades of black.

Each of the four discs has an annular legend strip on its periphery, each legend strip being evenly divided into the same number of circumferential spaces as there are radial spaces in the four annular bands on the comparator disc. These annular legend strips are an important feature of the invention, and each circumferential space carries a printed legend identifying the percentage of color found in radial spaces aligned therewith. Thus, by simply glancing at the legend strip spaces registered with a given radial space on one of the four bands of the comparator disc, the user is made aware of the primary color content of the displayed color. In other words, the device functions to automatically compute the primary color combination required to produce a given displayed color.

The number of different colors that can be simultaneously displayed on the color wheel of the invention is unusually large. Assuming that the primary color wheels are divided into 5% color divisions, this will create twenty-one spaces on each of the annular bands on the comparator disc, so that eighty-four different shades can be simultaneously shown. Adjusting the comparator disc to utilize the black tints significantly increases this number. Overall, assuming a twenty-one space annular band, some 80,000 different colors can be made to appear by rotating the four discs. Such a large display of colors makes it possible to quickly match a known color, and once this has been done the peripheral legend strips instantly make known the specific combination of primary colors, and black shading, which produces the identified color. If a single display of colors is not sufficient, the discs are easily manipulated to produce an entirely new collection of colors.

It is a principal object of the present invention to provide a color computer wheel which will simultaneously display a large number of colors, which can be easily adjusted to produce an entirely different array of colors, and which at all times fully identifies the specific combination of primary colors and black necessary to produce a given displayed color.

Another object is to provide a color computer wheel that displays in side-by-side relationship colors produced by combining all three primary colors in different combinations, as well as the three possible pairings of such primary colors.

A further object is to provide a color computer wheel that is economical to construct, which has a minimum of moving elements, and which is easy to manipulate.

Other objects and many of the attendant advantages of the invention will become readily apparent from the following description of the preferred embodiment, when considered in connection with the accompanying drawings.

DESCRIPTION OF THE PREFERRED EMBODIMENT

Figures 1, 2:
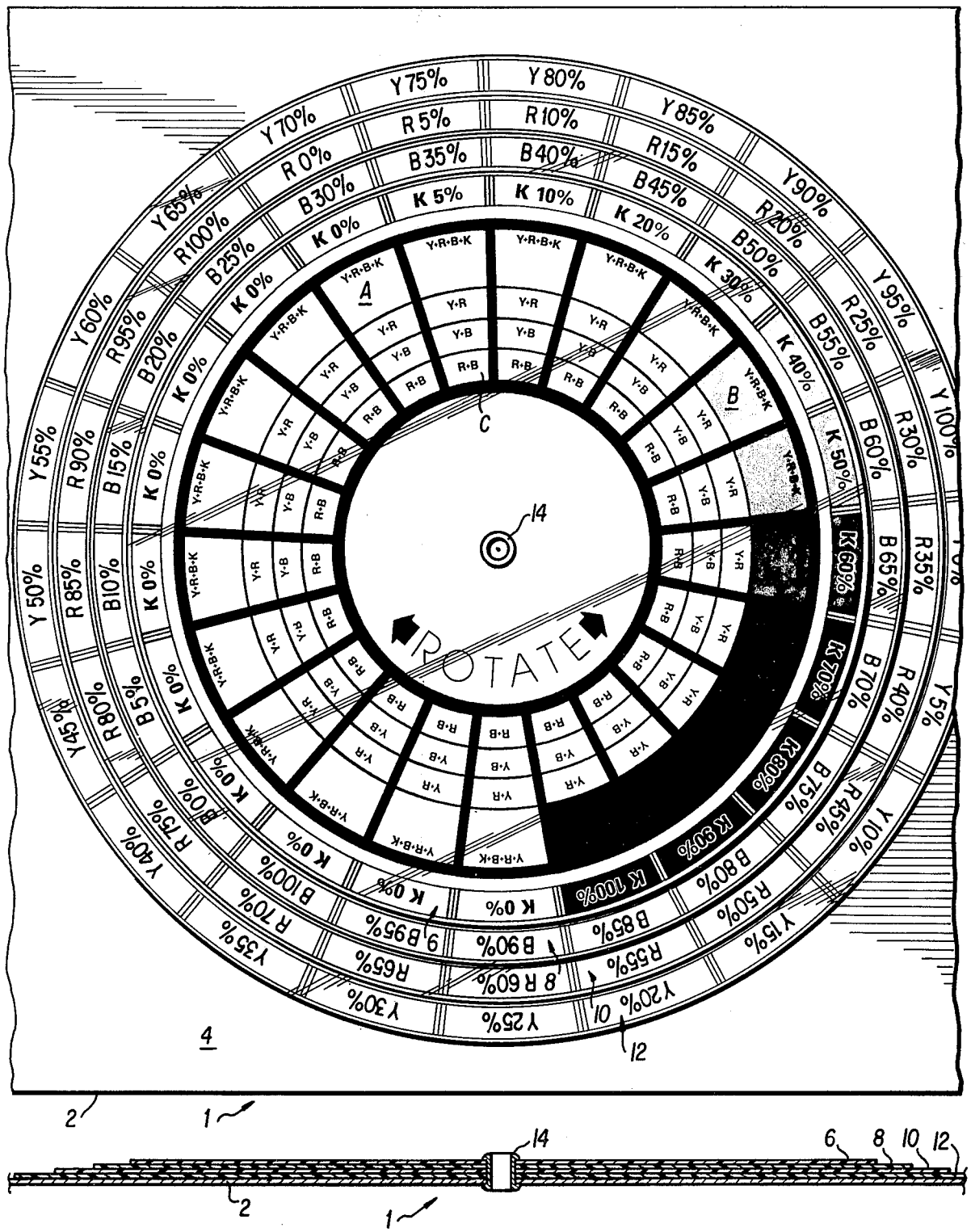
FIG. 1 is a top, plan view of the color computer wheel of the invention, showing the four discs of transparent material in a properly registered position for use.
FIG. 2 is a vertical sectional view taken centrally through the device of FIG. 1, showing the stacked arrangement of the base member and the four discs.

Referring now to FIGS. 1 and 2, the color computer wheel of the invention is indicated at 1 and includes a base member 2 which has a top surface 4 that is light in color, preferably white. The white or other light color aids in reflecting light through the discs mounted on the base, and the base is made sufficiently large so that it can carry any desired imprinting, and protect the discs mounted thereon.

Mounted on the base member 2 are four discs 6, 8, 10 and 12, all made of a transparent sheet material such as plastic, celluloid or the like. The four discs 6, 8, 10 and 12 are concentrically arranged, and a fastener 14 is passed through the common center points thereof and through the base member 2. The fastener 14 is preferably a rivet, and the base member 2 will typically be made of a plastic. As will be evident, the four discs 6, 8, 10 and 12 are thus mounted for free rotation in either direction about their center points.

The four discs 6, 8, 10 and 12 are of different diameters, as discussed above, with the diameters reducing from the bottom to the top of the stack. The topmost disc 6 is smallest in diameter, and constitutes a comparator disc for the device. The comparator or topmost disc 6 has an annular legend strip 16 marked completely about its periphery, and the discs 8, 10 and 12 have similar legend strips 18, 20 and 22, which are formed on the peripheral portion of each disc that projects outwardly beyond the periphery of the smaller in diameter disc thereabove. The peripheries of the four discs are thus arranged to be separately and easily grasped for turning the disc, and the legend strips marked or imprinted thereon are displayed for easy reading. Each of the legend strips 16, 18, 20 and 22 is divided equally into a number of circumferential spaces 24, 26, 28 and 30, respectively, the circumferential spaces in each band having identical arc lengths and each strip having the same number of circumferential spaces. It has been found that the use of twenty-one circumferential spaces in each legend strip is a preferable arrangement, such allowing each color to be displayed in intensity from 0 to 100% presence, at five percentage increments. As is evident from the drawings, the four legend strips 16, 18, 20 and 22 are easily arranged in a registered relationship, wherein the circumferential spaces 24, 26, 28 and 30 are in radial alignment.

Figure 3:
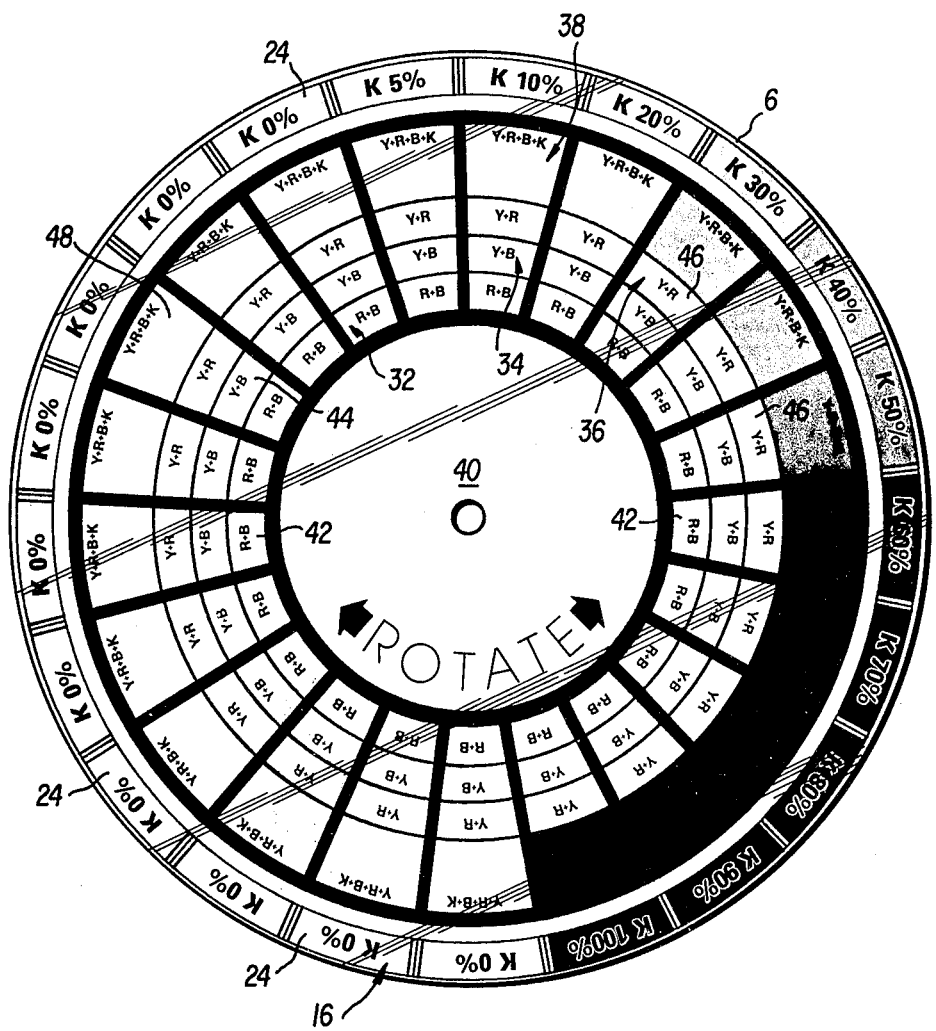
FIG. 3 is a plan view of the topmost or comparator disc of the four disc set, showing the arrangement thereof.

Turning now to FIG. 3, it is seen that the topmost comparator disc 6 is provided inwardly of the peripheral annular legend strip 16 with four annular bands 32, 34, 36 and 38, moving outwardly from a circular open space 40 provided centrally of the transparent disc. The open space 40 will typically have a diameter somewhat greater than about one-third the diameter of the disc 6, and can be utilized to carry suitable imprinted matter, as for example the designation "ROTATE" shown thereon in the drawings.

The four annular bands 32, 34, 36 and 38 are all evenly divided into radial spaces 42, 44, 46 and 48, with each band having the same number of radial spaces and this number being identical to the number of circumferential spaces 24, 26, 28 and 30 provided on the legend strips. The three inner bands 32, 34 and 36 are all clear and free of color, save for any legend material that is printed thereon, so that one can see therethrough without distortion or changing the color of any object therebeneath. The four annular bands and the radial spaces of the bands are closely spaced together, being divided only by imprinted lines. This provides a compact annular display area, where colors displayed in the different radial spaces 42, 44, 46 and 48 can be readily compared with each other.

A portion of the radial spaces 48 of the fourth or outer annular band 38 are also clear and free of color, usually about half thereof. The balance of the spaces 48 are tinted with black, with successive spaces being progressively darker. Preferably, this is done in increments of 10%, except that a value for 5%, is also utilized because of its common usage. As will be observed, the legend strip 16 carries the appropriate lettering in its circumferential spaces 24 to identify the color shading of the fourth annular band 38, the letter "K" indicating the color black, and the percentages being appropriately indicated from "K 0%" through "K 100%". All of the radial spaces 48 that are clear and free of color are identified with a "K 0%" legend, for ease in utilizing the computer.

The inner three annular bands 32, 34 and 36 of the comparator disc 6 are utilized to display the three possible paired colors obtainable when using three primary colors. The fourth, outermost band 38 is utilized to display the combination of all three primary colors, with and without the presence of black tones. Taking the three primary colors to be designated as blue, red and yellow, the radial spaces 42, 44, 46 and 48 of the four annular bands carry appropriate legends thereon to identify the primary colors on display therein. Specifically, all of the radial spaces 42 are imprinted with the legend "R+B", the spaces 44 with the legend "Y+B", the spaces 46 with the legend "Y+R", and the spaces 48 with the legend "Y+R+B+K", the "K" being included because the presence or absence of some shading of the color black is considered in all of the spaces 48 of the outermost annular band 38. It is of course understood that the color pairs could be changed about on the comparator disc 6, as could the location of the annular band wherein all of the primary colors and black are considered. However, it has been found that the arrangement as described and shown is preferable, and provides good results in practice.

The comparator disc 6 as just described, together with the peripheral legend strips 16, 18, 20 and 22, are important features of the device. Taken together, they provide the computer characteristics of the invention, which make it possible to easily calculate the makeup of any displayed color. The three individual primary color discs 8, 10 and 12 are arranged to be compatible with the comparator disc 6 and the legend strips.

Figure 4:
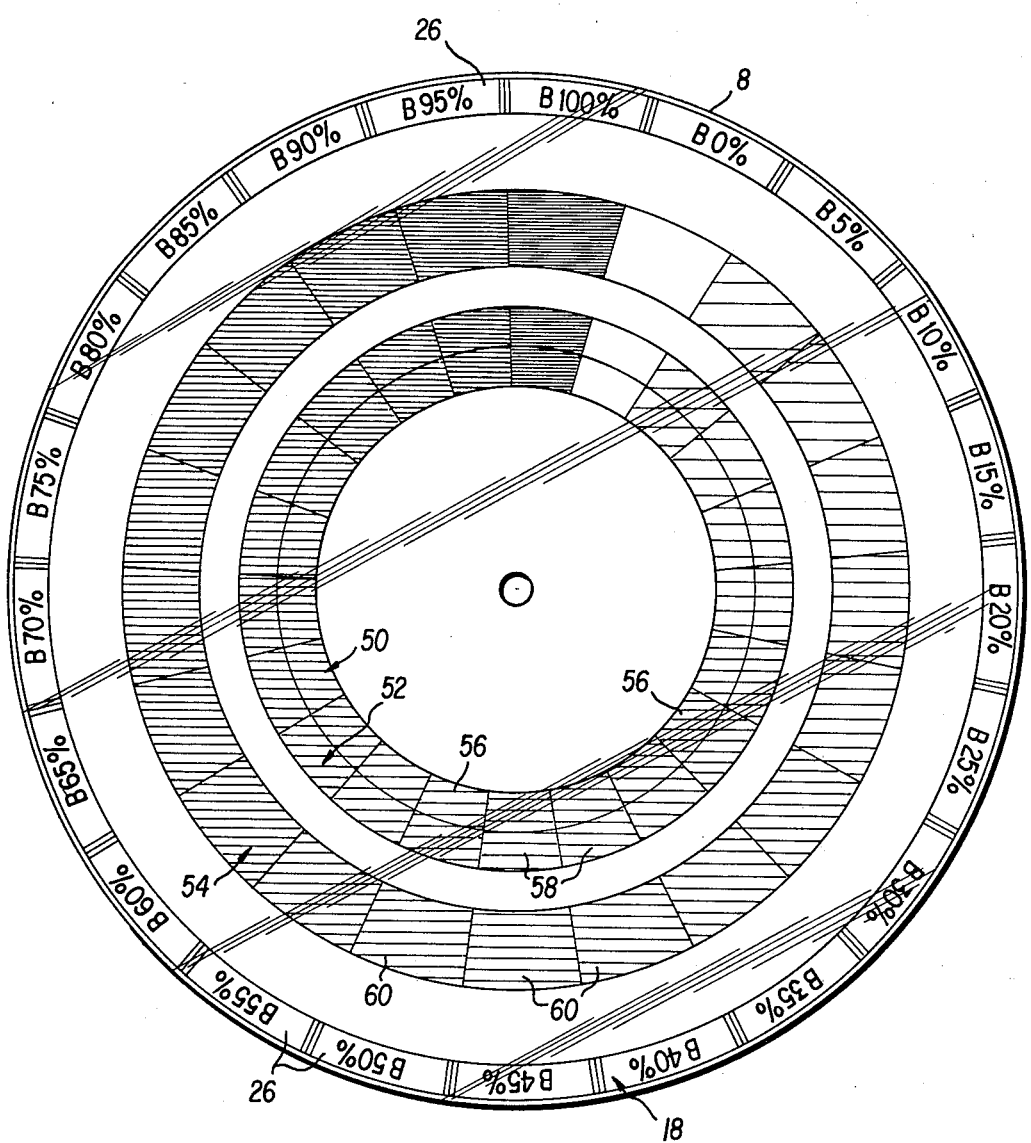
FIG. 4 is a plan view of the second disc, showing how three annular bands of a primary color are displayed thereon, the bands being shaded for blue, and each annular band being divided equally into radial spaces, with the radial spaces of each band progressing from an absence of the primary color to the 100% presence thereof, the shading reflecting this progression.

The disc 8 is disposed immediately beneath the topmost comparator disc 6, and is dedicated to a single primary color, which in the preferred embodiment is blue. In addition to the peripheral legend strip 18, the disc carries three annular bands of color thereon, identified by the numerals 50, 52 and 54, the two bands 50 and 52 being actually combined into a single wide band for convenience in manufacturing the disc. The bands 50, 52 and 54 are positioned to underlie the annular bands 32, 34 and 38 of the comparator disc 6, these being the bands on said disc which are intended to display the primary color blue, and they are respectively divided evenly into radial spaces 56, 58 and 60. The radial spaces 56, 58 and 60 are in radial register with each other and with the circumferential spaces 26 of the annular legend strip 18, and are the same in number as the spaces 26. As shown in FIG. 4, the radial spaces 56, 58 and 60 are tinted with different shades of blue from 0 to 100%, at 5% intevals, the shading moving progressively about the bands, and all radially aligned spaces having the same shade. The spaces 26 of the legend strip 18 are appropriately lettered from "B 0%" through "B 100%".

Figure 5:
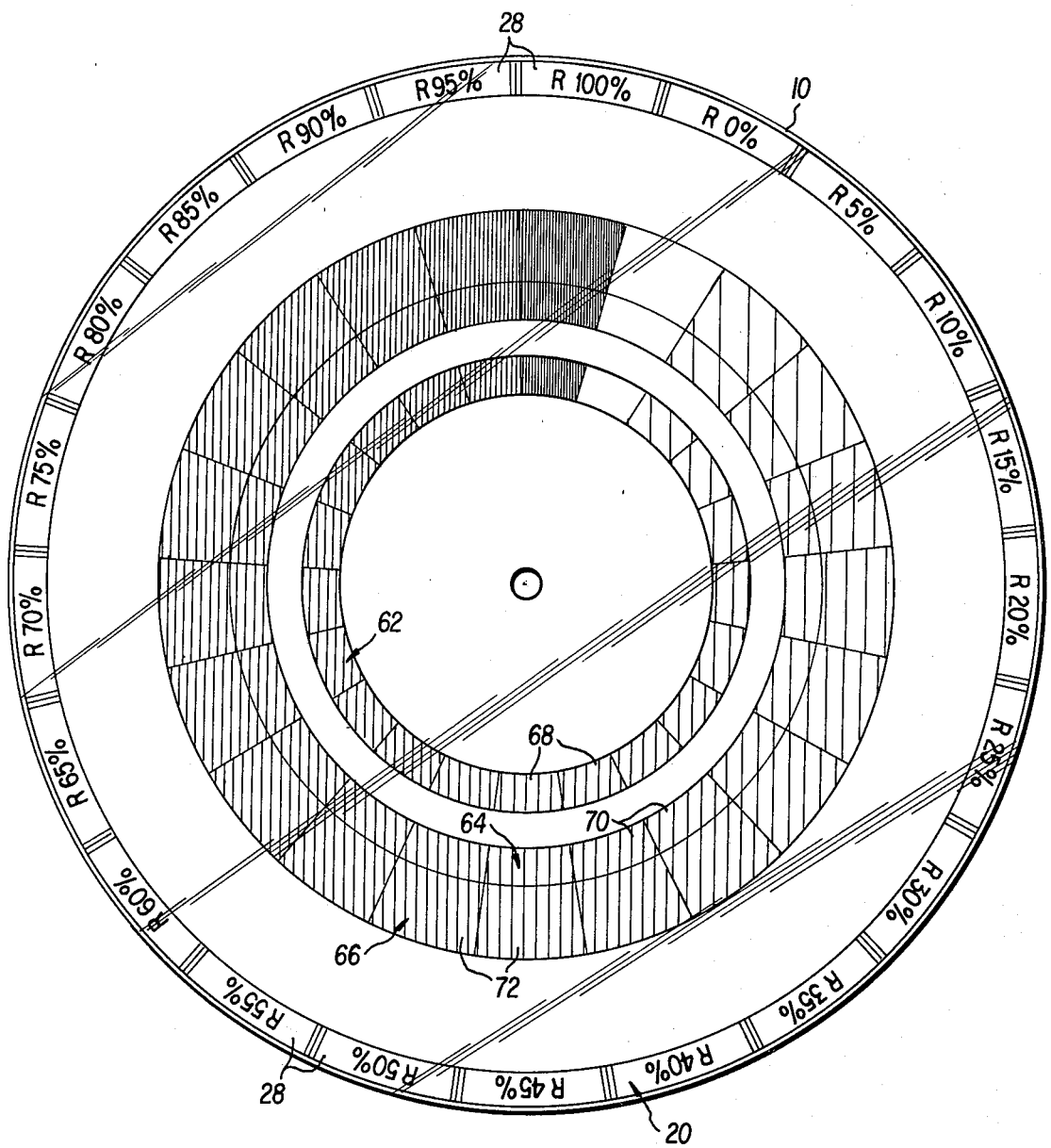
FIG. 5 is a plan view of the third disc, showing how three annular bands of a second primary color are displayed thereon, the bands being shaded for red in the same manner as in FIG. 4.

Turning now to FIG. 5, the third disc 10 is shown, and it lies immediately beneath the disc 8. The disc 10 carries three annular bands 62, 64 and 66, arranged to underlie the annular bands 32, 36 and 38 of the comparator disc 6, which are the bands that display the primary color found on the disc 10. The color of the disc 10 in the preferred embodiment is red, and the annular bands are appropriately cross-hatched for this color. The three bands 62, 64 and 66 are again equally divided into radial spaces 68, 70 and 72, and in this instance the bands 64 and 66 are combined into a single wide band. The radial spaces are progressively tinted with different shades of red from 0 to 100%, with 5% increments being utilized, and with the legend strip 20 carrying the legends "R 0%" to "R 100%".

Figure 6:
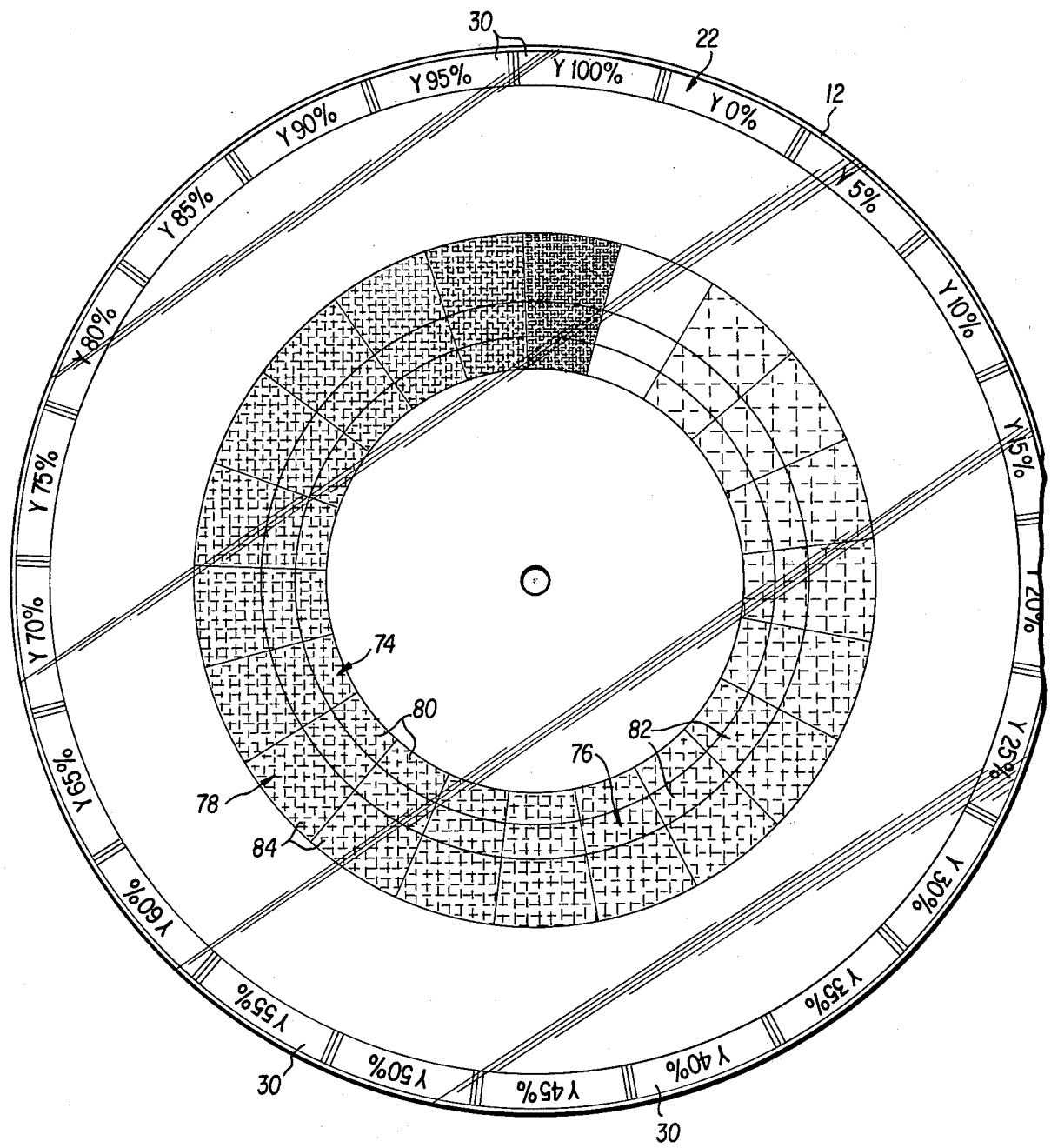
FIG. 6 is a plan view of the fourth or bottom disc, showing how four annular bands of a third primary color are arranged thereon to form a single wide annular band, the bands being shaded for yellow in the same manner as in FIG. 4.

Finally, as shown in FIG. 6, the bottommost disc 12 is utilized for the primary color yellow, and carries thereon three annular bands 74, 76 and 78, corresponding to and underlying the annular bands 34, 36 and 38 of the comparator disc 6, which are the bands displaying the color yellow. The bands 74, 76 and 78 are formed as a single wide band and are divided into equal radial spaces 80, 82 and 84, shaded with yellow from 0 to 100%, at 5% increments. Again, the circumferential spaces 30 of the legend 12 carry appropriate identifying legends, from "Y 0%" to "100%".

The three discs 8, 10 and 12 are thus similarly constructed. All carry annular bands of color, located to be properly displayed through the annular bands 32, 34, 36 and 38 of the topmost comparator disc 6. All of the annular bands of color on all three discs are divided into 5% color segments, with the color segments being arranged sequentially from 0 to 100%, and with all radially aligned radial spaces having the same percentage. The legend strips 18, 20 and 22 readily identify the colors and their percentages, and also are utilized for rotating the discs.

Returning now to FIG. 1, the manner of utilizing the color computer wheel 1 of the invention should be readily apparent. In FIG. 1 the three wheels 8, 10 and 12 have been set so that the radially aligned color percentages are different from each other, with all radial spaces in register. This results in a specific array of colors being displayed in the radial spaces of the annular bands on the topmost or comparator disc 6. If one selects a color found in the space marked "A", its component primary color combination can be determined by simply looking outwardly to the legend strips of the four discs. The annular band 38 in which "A" is located displays four colors. As noted by the legend "Y+R+B+K"; in this instance, the color found at "A" is composed of 70% yellow, 0% red, 30% blue and 0% black.

To provide another example, consider the space marked "B", also in the "Y+R+B+K" band. This color will be comprised of 95% yellow, 25% red, 55% blue and 40% black. Finally, consider the space marked "C" on the innermost annular band 32. The legend "R+B" printed on the space means that only red and blue are present. Looking outwardly, the color displayed is thus comprised of 5% red and 35% blue.

It is also apparent from FIG. 1 that if any one of the discs 8, 10 or 12 is rotated but a single space, a whole new array of colors will be formed in every space on the comparator disc 6 where that color disc carries annular color bands appearing in the space. The great number of different colors that can be generated with the invention is readily understood by this example.

It is to be understood that variations can be made in the invention without departing therefrom. For color printing usage, the shading of the colors should preferably correspond to commonly used screen print percentages. It should also be noted that the flexible transparent discs can be easily lifted separately or as a group to place stock thereunder, to make color comparisons.

We claim:

1. A wheel for comparing colors and computing color combinations, comprising:

a light colored base member;

a set of four circular, concentrically arranged discs made of transparent material rotatably mounted upon and secured to said base member by fastener means passed through the common centerpoints of said discs, whereby said four discs can each be independently rotated in either direction;

said four discs being of progressively decreasing diameter moving from the lowermost to the uppermost thereof, the first topmost disc being a comparator disc, and each of said four discs having an annular legend strip on the periphery thereof that is not covered by any other disc, all of said legend strips being divided into the same number of circumferential spaces of equal arc length extending about the entire periphery of said discs;

the first, topmost comparator disc being smallest in diameter of said four discs and carrying thereon four concentrically arranged bands positioned inwardly of the legend strip on said disc, all of said bands being divided into the same number of radial spaces as the number of circumferential spaces in said legend strips and said radial spaces of said four bands being in register with each other and with the circumferential spaces of the comparator disc legend strip, the radial spaces of the first, second and third of said bands being clear and free of color;

a portion of the adjacent radial spaces in the fourth of said four concentrically arranged bands on said comparator disc also being clear and free of color and the balance of said radial spaces in said fourth band being tinted with progressive shades of black, the circumferential spaces of said comparator legend strip carrying legends indicating the percentage of black tint for each radial space in said fourth band;

said first band on said comparator disc carrying a legend indicating that it shows colors found on a second and a third of said four discs, the second of said bands carrying a legend indicating that it shows colors found on said second and a fourth of said four discs, the third of said bands carrying a legend that it shows colors found on said third and said fourth of said four discs, and the fourth of said bands carrying a legend indicating that it shows colors found on said second, third and fourth of said four discs, together with whatever percentage of black tint is found in the radial spaces of said fourth band;

said second of said four discs having three concentric annular color bands thereon, positioned to underlie said first, said second and said fourth of said bands on said comparator disc, each of said color bands on said second disc being divided into the same number of equal arc length radial spaces as the number or circumferential spaces in said legend strips, the radial spaces of said three annular color bands being in register with each other and with the circumferential spaces of the legend strip on said second disc, and being tinted with progressive shades of a first primary color, each set of radially aligned radial spaces of the three annular color bands having the same shade of primary color, and the legend strip circumferential space aligned therewith carrying a legend indicating the percentage of such primary color;

said third of said four discs having three concentric annular color bands thereon, positioned to underlie said first, said third and said fourth of said bands on said comparator disc, each of said color bands on said third disc being divided into the same number of equal arc length radial spaces as the number of circumferential spaces in said legend strips, the radial spaces of said three annular color bands being in register with each other and with the circumferential spaces of the legend strip of said third disc, and being tinted with progressive shades of a second primary color, each set of radially aligned radial spaces of the three annular color bands having the same shade of primary color, and the legend strip circumferential space aligned therewith carrying a legend indicating the percentage of such primary color; and said fourth of said four discs having three concentric annular color bands thereon positioned to underlie the second, third and fourth of said bands on said comparator disc, each of said color bands on said fourth disc being divided into the same number of equal arc length radial spaces as the number of circumferential spaces in said legend strips, the radial spaces of said three annular color bands being in register with each other and with the circumferential spaces of the legend strip of said fourth disc, and being tinted with progressive shades of a third primary color, each set of radially aligned radial spaces of the three annular color bands having the same shade of primary color, and the legend strip circumferential space aligned therewith carrying a legend indicating the percentage of such primary color.

2. A wheel for comparing colors and computing color combinations as recited in claim 1, wherein said annular legend strips are each divided into twenty-one circumferential spaces of equal arc length.

3. A wheel for comparing colors and computing color combinations as recited in claim 2, wherein about one-half of the adjacent radial spaces in the fourth of said four concentrically arranged bands on said comparator disc are clear and free of color.

4. A wheel for comparing colors and computing color combinations as recited in claim 1, wherein said first, said second and said third primary colors are respectively blue, red and yellow.

5. A wheel for comparing colors and computing color combinations as recited in claim 1, wherein said four concentrically arranged bands on said comparator disc are immediately adjacent to each other, separated only by a circular line, so that comparison of the displayed colors is easily made.

6. A wheel for comparing colors and computing color combinations as recited in claim 5, wherein the innermost of said four concentrically arranged bands has a diameter greater than about one-third the diameter of said first, comparator disc, whereby to array said four bands concentrically about a relatively large central area for ease in comparing colors.

* * * * *